United States Patent
Liu et al.

(10) Patent No.: US 9,294,390 B2
(45) Date of Patent: Mar. 22, 2016

(54) HASH TABLE STORAGE AND SEARCH METHODS AND DEVICES

(75) Inventors: Zhenxiao Liu, Beijing (CN); Xindong Teng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 902 days.

(21) Appl. No.: 13/489,671

(22) Filed: Jun. 6, 2012

(65) Prior Publication Data

US 2012/0246163 A1 Sep. 27, 2012

Related U.S. Application Data

(63) Continuation of application No. PCT/CN2010/076161, filed on Aug. 19, 2010.

(51) Int. Cl.
*H04L 12/721* (2013.01)
*H04L 12/741* (2013.01)
*H04L 12/743* (2013.01)

(52) U.S. Cl.
CPC .............. *H04L 45/38* (2013.01); *H04L 45/54* (2013.01); *H04L 45/7453* (2013.01)

(58) Field of Classification Search
None
See application file for complete search history.

(56) References Cited

U.S. PATENT DOCUMENTS

| 6,212,184 | B1* | 4/2001 | Venkatachary et al. ...... 370/392 |
| 6,950,434 | B1* | 9/2005 | Viswanath et al. ........... 370/392 |
| 2003/0053448 | A1* | 3/2003 | Craig et al. .................... 370/353 |
| 2003/0154399 | A1* | 8/2003 | Zuk et al. ....................... 713/201 |
| 2004/0100956 | A1 | 5/2004 | Watanabe |
| 2004/0190526 | A1 | 9/2004 | Kumar et al. |
| 2005/0254502 | A1* | 11/2005 | Choi ......................... 370/395.32 |
| 2006/0036627 | A1 | 2/2006 | Deran |

FOREIGN PATENT DOCUMENTS

| CN | 1503165 | 6/2004 |
| CN | 1534942 | 10/2004 |
| CN | 101034412 A | 9/2007 |
| CN | 101247337 | 8/2008 |
| CN | 101247337 A | 8/2008 |

OTHER PUBLICATIONS

PCT International Search Report mailed May 26, 2011, issued in related International Application No. PCT/CN2010/076161, Huawei Technologies Co., Ltd. (4 pages).

* cited by examiner

*Primary Examiner* — Hassan Kizou
*Assistant Examiner* — Hashim Bhatti

(57) ABSTRACT

A hash table storage method includes: obtaining attribute information of at least two levels of hash tables; sequentially obtaining Key information from a received packet according to the attribute information of the at least two levels of hash tables; sequentially determining whether the Key information is stored in its corresponding hash table; and storing the Key information in its corresponding hash table if the Key information is not stored in its corresponding hash table.

4 Claims, 4 Drawing Sheets

HASH TABLE STORAGE AND SEARCH METHODS AND DEVICES

CROSS-REFERENCE TO RELATED APPLICATIONS

This application is a continuation of International Application No. PCT/CN2010/076161, filed on Aug. 19, 2010, which is hereby incorporated by reference in its entirety.

FIELD OF THE APPLICATION

The present application relates to the field of communication technologies, and in particular, to hash table storage and search methods and devices.

BACKGROUND OF THE APPLICATION

Hash algorithms are simple in implementation and perform at a fast speed, so hash algorithms are used in areas such as data retrieval and data membership determination. In a router, hash algorithms are generally used for exact match tables, such as Media Access Control (MAC) table, the table of black and white lists and the flow table.

For different exact match tables, the hash algorithms need to use different hash tables. For example, when a Key to be searched for is long, the hash algorithm chooses a hash table that includes a hash index table and an original Key table, as shown in FIG. 1. A hash fingerprint of the Key and an index to an original Key are stored in the hash index table; and the original Key is stored in the original Key table. The original Key corresponds to the original Key index in one-to-one correspondence. When the Key to be searched for is short, the hash algorithm chooses a hash table structure with only the original Keys.

For different exact match tables, the hash algorithms need to use different hash. tables. For example, the flow table and the table of black and white lists in the router need to establish different hash table structures. Keys in the table of black and white lists are part of Keys in the flow table. However, the same part of the Keys still needs to be stored in both hash tables. In this way, in a process for storing and searching a plurality of hash tables of Keys having common parts, the common parts are stored many times, so that the storage space is wasted.

SUMMARY

In order to solve the foregoing problem, embodiments provide hash table storage and search methods and devices.

In the implementation, an embodiment provides a hash table storage method, where the method includes:
 obtaining attribute information of at least two levels of hash tables;
 sequentially obtaining Key information of the at least two levels of hash tables from a received packet according to the attribute information of the at least two levels of hash tables;
 sequentially determining whether the Key information is stored in its corresponding hash table; and
 storing the Key information in its corresponding hash table if the Key information is not stored in its corresponding hash table.

In the implementation, an embodiment provides a hash table search method, where the method includes:
 obtaining attribute information of at least two levels of hash tables;
 sequentially obtaining Key information for the at least two levels of hash tables from a received packet according to the attribute information of the at least two levels of hash tables;
 sequentially determining whether the Key information is stored in its corresponding hash table; and
 executing a corresponding action of the hash table corresponding to the Key information, and/or continuing to search for a next-level hash table if the Key information is stored in its corresponding hash table.

In the implementation, an embodiment provides a hash table storage device, where the device includes:
 an attribute information obtaining unit, configured to obtain attribute information of at least two levels of hash tables;
 a Key information obtaining unit, configured to sequentially obtain Key information of the at least two levels of hash tables from a received packet according to the attribute information of the at least two levels of hash tables;
 a determination unit, configured to sequentially determine whether the Key information is stored in its corresponding hash table; and
 a storage unit, configured to store the Key information in its corresponding hash table if the Key information is not stored in its corresponding hash table.

In the implementation, an embodiment provides a hash table search method, where the method includes:
 an attribute information obtaining unit, configured to obtain attribute information of at least two levels of hash tables;
 a Key information obtaining unit, configured to sequentially obtain Key information of the at least two levels of hash tables from a received packet according to the attribute information of the at least two levels of hash tables;
 a determination unit, configured to sequentially determine whether the Key information is stored in its corresponding hash table; and
 a processing unit, configured to execute a corresponding action of the hash table corresponding to the Key information, and/or continue to search for a next-level hash table if the Key information is stored in its corresponding hash table.

The embodiments provide hash table storage and search methods and devices, attribute information of at least two levels of hash tables is obtained; Key information of at least two levels of hash tables is obtained from a received packet according to the attribute information of the at least two levels of hash tables; whether the Key information is stored in its corresponding hash table is sequentially determined; in the process of storing the hash table, if the Key information is not stored in its corresponding hash table, the Key information is stored in its corresponding hash table; in the process of searching for the hash table, if the Key information is stored in its corresponding hash table, a corresponding action of the hash table corresponding to the Key information is executed, and/or a next-level hash table continues to be searched for. In the present embodiments, storage of or search for the Key information of the received packet is performed segment by segment according to the attribute information of the hash table; if the segmented Key information is stored in its corresponding hash table, duplicate storage is not performed anymore. In this way, common parts of the Key information of the Keys only needs to be stored once, and does not need to be stored and searched for more than once, thereby greatly saving the storage space and increasing the search efficiency.

DETAILED DESCRIPTION OF THE EMBODIMENTS

To solve the problem that Keys having common parts are stored many times and the storage space is wasted in the prior art, embodiments of the present invention provide hash table storage and search methods and devices, and the present invention is described in detail with reference to the accompanying drawings and the embodiments.

Figure 1:
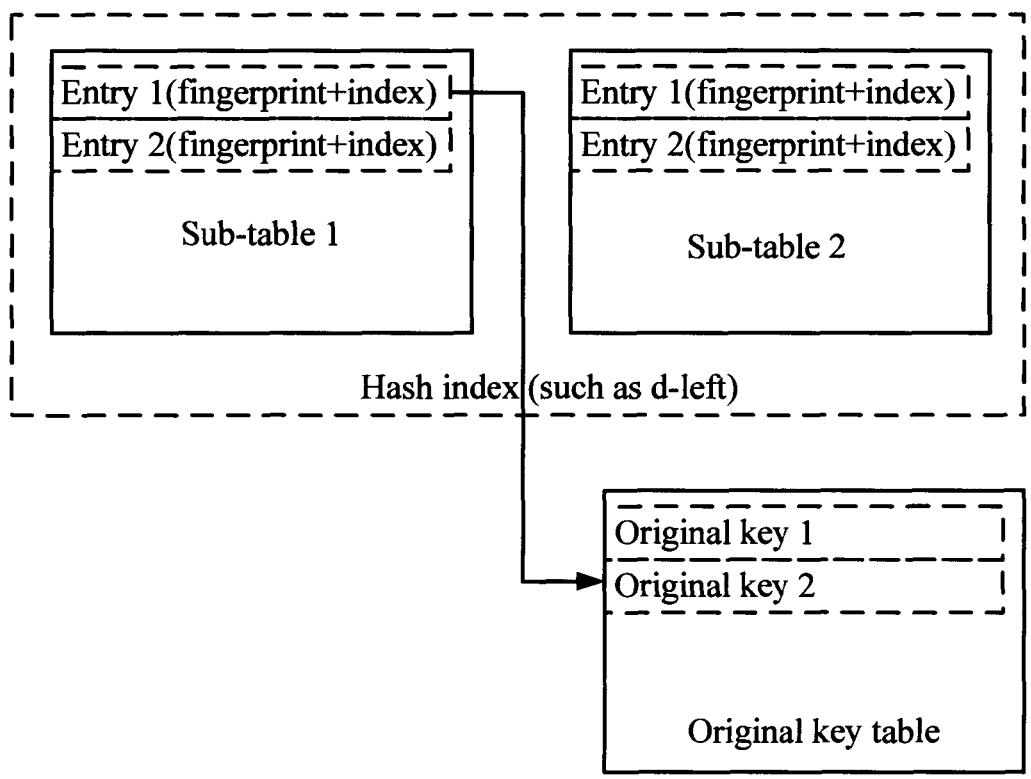
FIG. 1 is a schematic structural diagram of a hash index table and an original Key table in the prior art.
Figure 2:
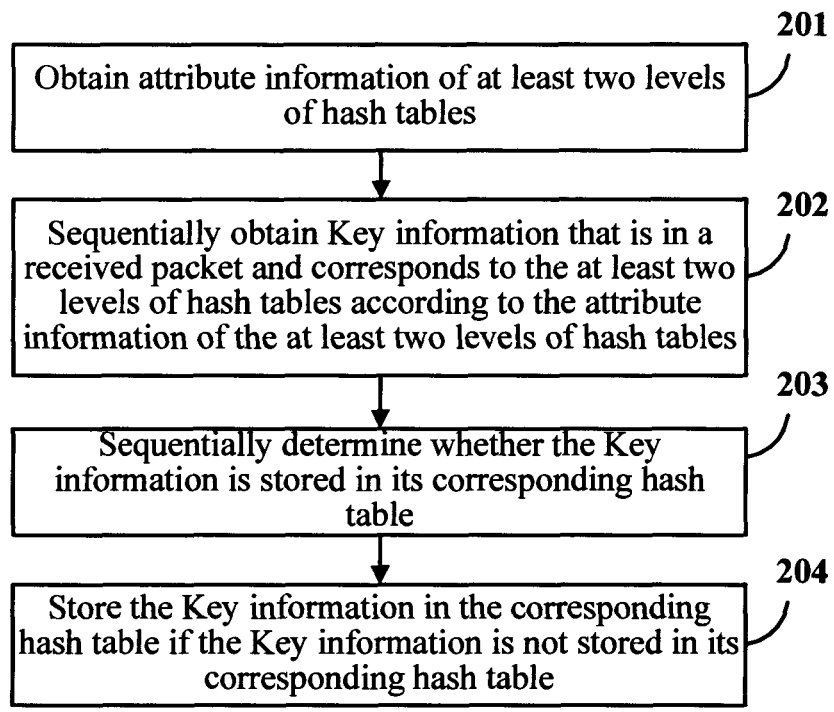
FIG. 2 is a flow chart of a hash table storage method according to an embodiment of the present invention.

FIG. 2 illustrates a hash table storage method according to an embodiment of the present invention. The method includes the following steps:

201: Obtain attribute information of at least two levels of hash tables.

202: Obtain Key information of at least two levels of hash tables from a received packet according to the attribute information of the at least two levels of hash tables.

203: Sequentially determine whether the Key information is stored in its corresponding hash table.

204: If the Key information is not stored in its corresponding hash table, store the Key information in its corresponding hash table.

It is assumed hereinafter that the hash table storage and search methods and devices are applied to hash table storage and search processes of a table of black and white lists and a flow table in a router, in which, a hash table Key of the table of black and white lists is a source Internet Protocol (IP) address+a destination IP address; a hash table Key of the flow table is a source IP address+a destination IP address+a source port+a destination port+a protocol type. According to the Keys of the table of black and white lists and the flow table, two levels of hash tables may be adopted, that is, a first-level hash table and a second-level hash table, in which, it is assumed that the attribute information of the first-level hash table is a source IP address+a destination IP address; attribute information of the second-level hash table is a source port+a destination port+a protocol type.

Figure 3:
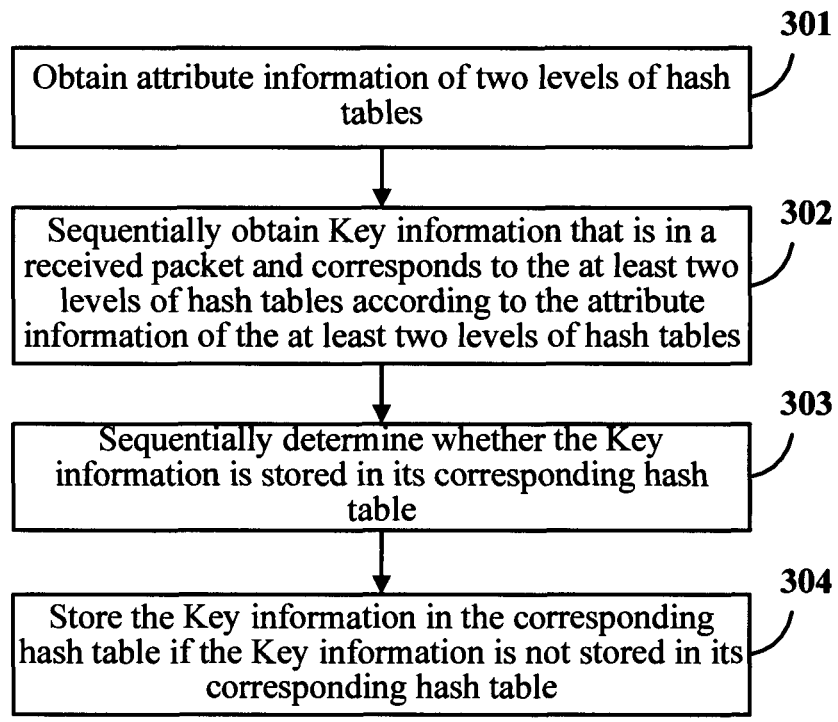
FIG. 3 is a flow chart of specific implementation of a hash table storage method applied to a storage process of a Key of a table of black and white lists and a Key of a flow table according to an embodiment of the present invention.

When the hash table storage method is applied to storage processes of a Key of the table of black and white lists and the Key of a flow table, as shown in FIG. 3, the specific implementation includes the following steps:

301: Obtain attribute information of two levels of hash tables, that is, attribute information of the first-level hash table and attribute information of the second-level hash table, in which, attribute information of the first-level hash table is a source IP address+a destination IP address; attribute information of the second-level hash table is a source port+a destination port+a protocol type.

302: Sequentially obtain Key information of two levels of hash tables from a received packet according to the attribute information of the two levels of hash tables. For example, if the received packet is a packet requiring searching for the table of black and white lists, the source IP address+the destination IP address of the received packet are obtained according to the attribute information of the first-level hash table, that is, the source IP address+the destination IP address; then step 303 is executed; if the received packet is a packet requiring searching for the flow table, the source IP address+the destination IP address of the received packet are first obtained according to the attribute information of the first-level hash table, that is, the source IP address+the destination IP address; the source port+the destination port+the protocol type of the received packet are then obtained according to the attribute information of the second-level hash table, that is, the source port+the destination port+the protocol type.

If the received packet is a packet requiring searching for the flow table, after the source IP address+the destination IP address corresponding to the attribute information of the first-level hash table are obtained, steps 303 and 304 may be executed, and the storage process of the first-level hash table is completed; the source port+the destination port+the protocol type of the received packet are then obtained according to the attribute information of the second-level hash table, that is, the source port+the destination port+the protocol type; after the source port+the destination port+the protocol type corresponding to the attribute information of the second-level hash table are obtained, steps 303 and 304 are executed, and the storage process of the second-level hash table is completed.

Alternatively, if the received packet is a packet requiring searching for the flow table, after the source IP address+the destination IP address corresponding to the attribute information of the first-level hash table are obtained, the source port+the destination port+the protocol type of the received packet are obtained according to the attribute information of the second-level hash table, that is, the source port+the destination port+the protocol type; after the attribute information of the first-level hash table, that is, the source IP address+the destination IP address, and the attribute information of the second-level hash table, that is, the source port+the destination port+the protocol type are obtained, wherein the attribute information corresponds to the packet of the flow table, steps 303 and 304 are first executed according to the obtained attribute information, that is, the source IP address+the destination IP address, and the storage process of the first-level hash table is completed; steps 303 and 304 are then executed according to the obtained attribute information, that is, the source port+the destination port+the protocol type, and the storage process of the second-level hash table is completed.

303: Sequentially determine whether the Key information is stored in its corresponding hash table. For example, if the received packet is a packet requiring searching for the table of black and white lists, the obtained Key information, that is, the source IP address+the destination IP address, is compared with the Key in the first-level hash table; if there is no match, it indicates that the Key information is not stored in the first-level hash table, step 304 is executed; if there is a match, it indicates that the Key information is stored in the first-level hash table.

It should be noted that, if the Key information is not stored in its corresponding hash table, the method further includes: obtaining an identifier corresponding to the key information that is not stored from an identifier management table. The identifier management table is generally a linked list structure, and is configured to store an identifier and status information of the identifier; the identifier management table may dynamically allocate an identifier to the key information that is not stored, and may also recycle a corresponding identifier upon deletion of a Key information, thereby ensuring the uniqueness of the allocated identifier.

304: If the Key information is not stored in its corresponding hash table, store the Key information in its corresponding hash table. For example, if the received packet is a packet requiring searching for the table of black and white lists, the obtained Key information, that is, the source IP address+the destination IP address, is compared with the Key in the first-level hash table; if there is no match, it indicates that the Key information is not stored in the first-level hash table; an identifier corresponding to the key is obtained from the identifier management table, and the identifier and Key information corresponding to the identifier are stored together in the first-level hash table; if there is a match, it indicates that the Key information is stored in the first-level hash table, and a corresponding identifier exists in the first-level hash table. If the received packet further needs to search for the flow table in addition to the table of black and white lists, the Key information of the packet of the flow table, that is, the source port+the destination port+the protocol type continues to be obtained, and the identifier corresponding to the first-level hash table and the obtained Key information, that is, the source port+the destination port+the protocol type, are compared with the Key in the second-level hash table; if there is no match, it indicates that the Key information is not stored in the second-level hash table; an identifier corresponding to the key information that is not stored is obtained from the identifier management table, the identifier, Key information corresponding to the identifier, and the identifier corresponding to the Key information that is stored in the first-level hash table of the flow table packet are stored together in the second-level hash table.

It should be noted that, when the at least two levels of hash tables are N levels of hash tables, N>1, and N is a positive integer, and if for an $i^{th}$-level-hash table, i=1, Key information stored in a first-level hash table includes Key information that corresponds to the first-level hash table that is obtained from the received packet.

If for the $i^{th}$-level-hash table, N≥i≥2, and i is a positive integer, Key information stored in the $i^{th}$-level-hash table includes: Key information that corresponds to the $i^{th}$-level-hash table that is obtained from the received packet, and an identifier that corresponds to Key information of an $(i-1)^{th}$-level hash table that is from the received packet.

Figure 4:
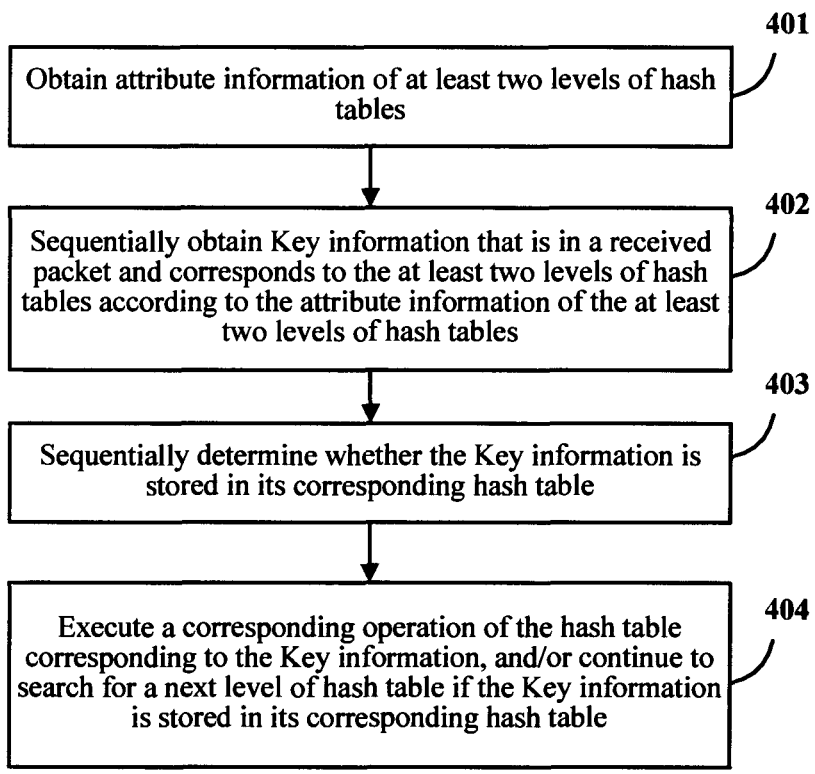
FIG. 4 is a flow chart of a hash table search method according to an embodiment of the present invention.

FIG. 4 illustrates a hash table search method according to an embodiment of the present invention. The method includes the following steps:

401: Obtain attribute information of at least two levels of hash tables.

402: Sequentially obtain Key information from a received packet and according to the attribute information of the at least two levels of hash tables.

403: Sequentially determine whether the Key information is stored in its corresponding hash table.

404: If the Key information is stored in its corresponding hash table, execute a corresponding action of the hash table corresponding to the Key information, and/or continue to search a next-level hash table.

Figure 5:
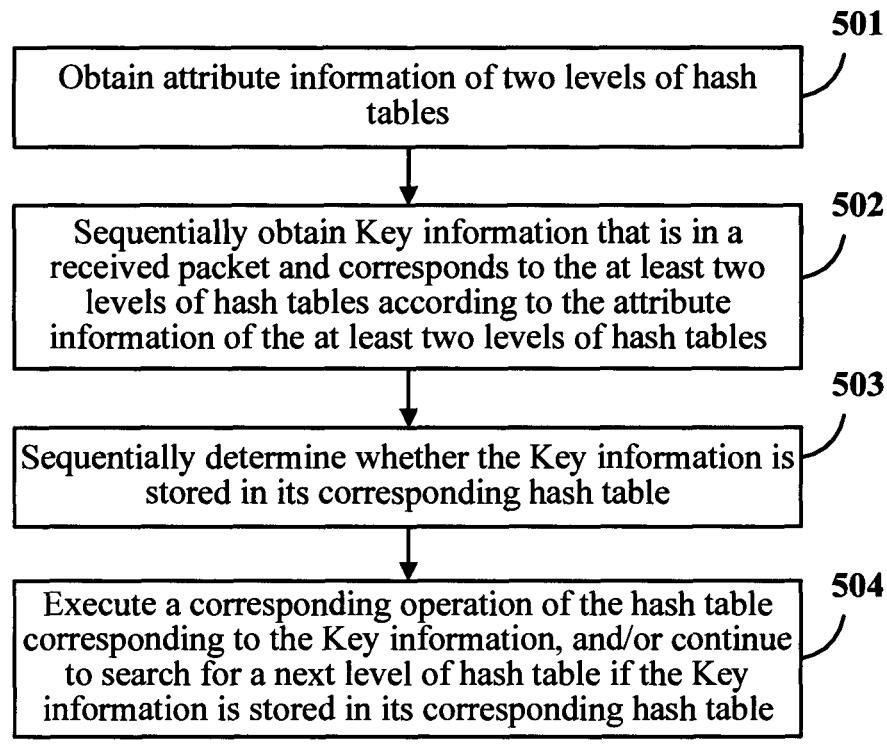
FIG. 5 is a flow chart of specific implementation of a hash table search method applied to a search process of a Key of a table of black and white lists and a Key of a flow table according to an embodiment of the present invention.

When the hash table search method is applied to a search process of a Key of a table of black and white lists and a Key of a flow table, as shown in FIG. 5, the specific implementation includes the following steps:

501: Obtain attribute information of two levels of hash tables, that is, attribute information of the first-level hash table and attribute information of the second-level hash table, in which, attribute information of the first-level hash table is a source IP address+a destination IP address; attribute information of the second-level hash table is a source port+a destination port+a protocol type.

502: Sequentially obtain Key information of at least two levels of hash table from a received packet according to the attribute information of the at least two levels of hash tables. For example, if the received packet is a packet requiring searching of the table of black and white lists, the source IP address+the destination IP address of the received packet are obtained according to the attribute information of the first-level hash table, that is, the source IP address+the destination IP address; then step 503 is executed; if the received packet is a packet requiring searching of the flow table, the source IP address+the destination IP address of the received packet are first obtained according to the attribute information of the first-level hash table, that is, the source IP address+the destination IP address; the source port+the destination port+the protocol type of the received packet are then obtained according to the attribute information of the second-level hash table, that is, the source port+the destination port+the protocol type.

Alternatively, if the received packet is the packet requiring searching of the flow table, after the source IP address+the destination IP address corresponding to the attribute information of the first-level hash table are obtained, steps 503 and 504 may be executed, and the search process of the first-level hash table is completed; then the source port+the destination port+the protocol type of the received packet are obtained according to the attribute information of the second-level hash table, that is, the source port+the destination port+the protocol type; after the source port+the destination port+the protocol type corresponding to the attribute information of the second-level hash table are obtained, steps 503 and 504 are executed, and the search process of the second-level hash table is completed. In the process of the second-level hash table, the process of the first-level hash table is not repeated anymore; instead, the result of the first-level hash table is utilized.

Alternatively, if the received packet is the packet requiring searching for the flow table, after the source IP address+the destination IP address corresponding to the attribute information of the first-level hash table are obtained, the source port+the destination port+the protocol type of the received packet are obtained according to the attribute information of the second-level hash table, that is, the source port+the destination port+the protocol type; after the attribute information of the first-level hash table, that is, the source IP address+the destination IP address, and the attribute information of the second-level hash table, that is, the source port+the destination port+the protocol type, are obtained, steps 503 and 504 are first executed according to the obtained attribute information, that is, the source IP address+the destination IP address, and the search process of the first-level hash table is completed; steps 503 and 504 are then executed according to the obtained attribute information, that is, the source port+the destination port+the protocol type, and the search process of the second-level hash table is completed. In the process of the second-level hash table, the process of the first-level hash table is not repeated anymore; instead, the result of the first-level hash table is utilized.

503: Sequentially determine whether the Key information is stored in its corresponding hash table. For example, if the received packet is a packet requiring searching of the table of black and white lists, the obtained Key information, that is, the source IP address+the destination IP address, is compared with the Key in the first-level hash table. If there is not a match, it indicates that the Key information is not stored in the first-level hash table, and the process ends; if there is a match, it indicates that the Key information is stored in the first-level hash table.

504: If the Key information is stored in its corresponding hash table, execute a corresponding action of the hash table corresponding to the Key information, and/or continue to search a next-level hash table.

It should be noted that, if it is determined that the Key information is stored in its corresponding hash table, the method may further include: obtaining an identifier corresponding to current Key information; and continuing to determine whether the Key information of the next-level hash table is stored in its corresponding hash table according to the identifier corresponding to the current Key information and the Key information from the received packet that corresponds to the next-level hash table in the received packet. For example, if the received packet is the packet requiring searching of the flow table, the obtained Key information, that is, the source IP address+the destination IP address, is compared with the Key in the first-level hash table. If there is a match, it indicates that the Key information is stored in its corresponding hash table, and then an action of the first-level hash table is performed according to a preset operation, and/or, the second-level hash table continues to be searched. According to the Key information of the second-level hash table that is from the received packet, that is, the source port+the destination port+the protocol type, and the corresponding identifier of the Key information that is stored in the first-level hash table and is in the received packet, determine whether the Key information of the second-level hash table, that is, the source port+the destination port+the protocol type, and the corresponding identifier of the Key information that is stored in the first-level hash table and is in the received packet are stored in the second-level hash table; if there is a match in the second-level hash tables, the action of the second-level hash table is performed according to the preset operation; if there is not a match, the process ends.

It should be noted that, when the at least two levels of hash tables are N levels of hash tables, N>1, and N is a positive integer, and if for an $i^{th}$-level-hash table, i=1, Key information stored in a first-level hash table includes: Key information that corresponds to the first-level hash table that is obtained from the received packet.

If for the $i^{th}$-level-hash table, N≥i≥2, and i is a positive integer, Key information stored in the $i^{th}$-level-hash table includes: Key information that corresponds to the $i^{th}$-level-hash table that is obtained from the received packet, and an identifier that corresponds to Key information of an $(i-1)^{th}$-level hash table that is from the received packet.

It should be further noted that, the foregoing at least two levels of hash tables may be a hash table that includes a hash index table and an original Key table, and may also be a hash table in a structure of only containing the original Key table, the present invention is not limited to the specific structure of the hash table, the specific structure may be chosen according to practical needs.

Figure 6:
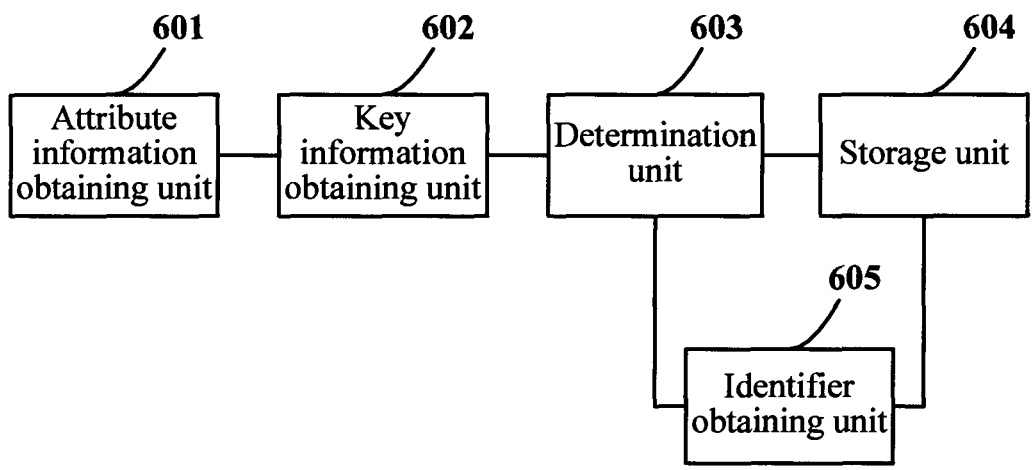
FIG. 6 is a schematic structural diagram of a hash table storage device according to an embodiment of the present invention.

FIG. 6 illustrates a hash table storage device according to an embodiment of the present invention. The device includes an attribute information obtaining unit 601, a Key information obtaining unit 602, a determination unit 603, and a storage unit 604.

The attribute information obtaining unit 601 is configured to obtain attribute information of at least two levels of hash tables.

The Key information obtaining unit 602 is configured to sequentially obtain Key information that is in a received packet and corresponds to the at least two levels of hash tables according to the attribute information of the at least two levels of hash tables.

The determination unit 603 is configured to sequentially judge whether the Key information is stored in its corresponding hash table.

The storage unit 604 is configured to store the Key information in its corresponding hash table if the Key information is not stored in its corresponding hash table.

If the Key information is not stored in its corresponding hash table, the device further includes an identifier obtaining unit 605.

The identifier obtaining unit 605 is configured to obtain an identifier corresponding to the key information that is not stored.

The storage unit 604 is further configured to store the identifier and Key information corresponding to the identifier together in its corresponding hash table.

Figure 7:
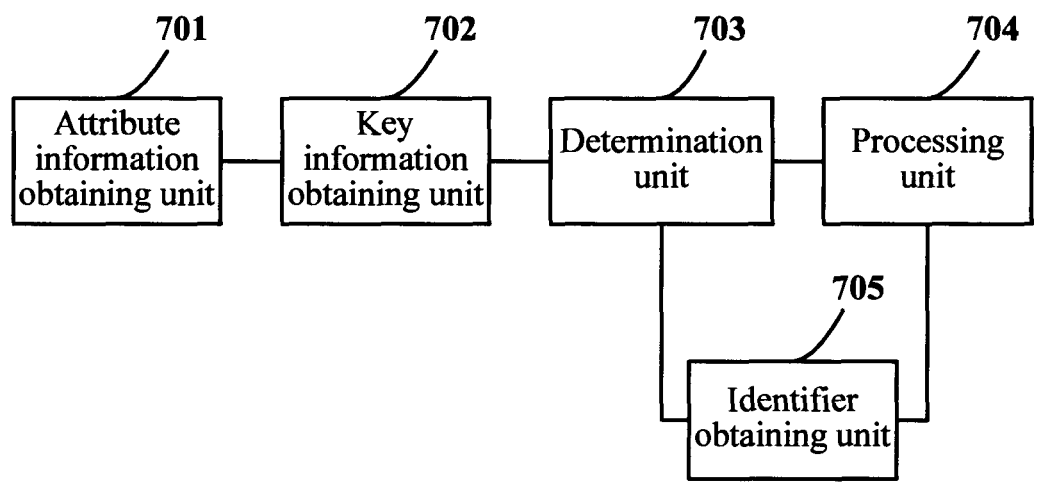
FIG. 7 is a schematic structural diagram of a hash table search device according to an embodiment of the present invention.

FIG. 7 illustrates a hash table search device according to an embodiment of the present invention. The device includes an attribute information obtaining unit 701, a Key information obtaining unit 702, a determination unit 703, and a processing unit 704.

The attribute information obtaining unit 701 is configured to obtain attribute information of at least two levels of hash tables.

The Key information obtaining unit 702 is configured to sequentially obtain Key information that is in a received packet and corresponds to the at least two levels of hash tables according to the attribute information of the at least two levels of hash tables.

The determination unit 703 is configured to sequentially determine whether the Key information is stored in its corresponding hash table.

The processing unit 704 is configured to execute a corresponding action of the hash table corresponding to the Key information, and/or continue to search a next-level hash table if the Key information is stored in its corresponding hash table.

It should be noted that, the device may further include an identifier obtaining unit 705.

The identifier obtaining unit 705 is configured to obtain an identifier corresponding to current Key information when it is determined that the Key information is stored in its corresponding hash table.

The determination unit 703 is further configured to continue to determine whether Key information of the next-level hash table is stored in its corresponding hash table according to the identifier corresponding to the current Key information and the Key information from the received packet corresponding to the next-level hash table.

The present invention provides hash table storage and search methods and devices. The attribute information of at least two levels of hash tables is obtained. Then Key information that is from a received packet and corresponds to each of the at least two levels of hash tables is sequentially obtained according to the attribute information of the at least two levels of hash tables.

Then whether the Key information is stored in its corresponding hash table is sequentially determined. In the process of storing the hash table, if the Key information is not stored in its corresponding hash table, the Key information is stored in its corresponding hash table. In the process of searching for the hash table, if the Key information is stored in its corresponding hash table, a corresponding action of the hash table corresponding to the Key information is executed, and/or a next-level hash table continues to be searched. Compared with the prior art, in the present invention, storage or search is performed segment by segment on the Key information of the received packet according to the attribute information of the hash table; if the common part of the Key information is stored in its corresponding hash table, duplicate storage is omitted. In this way, common parts of the Key information only needs to be stored only once, and does not need to be stored and searched for multiple times, thereby greatly saving the storage space and increasing the search efficiency.

Through the foregoing description of the embodiments, persons skilled in the art may understand that all or part of the steps of the method according to the embodiments of the present invention may be implemented by a program instructing relevant hardware. The program may be stored in a computer readable storage medium, and the execution of the program includes the steps of the method. The storage medium includes a Read-Only Memory (ROM), a Random Access Memory (RAM), a magnetic disk or an optical disk.

In conclusion, the above descriptions are merely exemplary embodiments of the present invention. However, the scope of the present invention is not limited thereto. Changes or replacements readily apparent to persons skilled in the prior art within the technical scope of the present invention should fall within the scope of the present invention. Therefore, the protection scope of the present invention is subject to the appended claims.

What is claimed is:

1. A hash table storage method, comprising:
   receiving a packet;
   acquiring a first field from the packet, wherein the first field corresponds to attribute information of a first hash table;
   acquiring a second field from the packet, wherein the second field corresponds to attribute information of a second hash table, the attribute information of the first hash table is different from the attribute information of the second hash table and the first field is different from the second field;
   determining whether the first field matches with the first hash table;
   in response to the first field matching with the first hash table, determining whether the second field matches with the second hash table; and in response to the second field failing to match with the second hash table, storing the second field into the second hash table;
   wherein the step of determining whether the second field matches with the second hash table comprises: determining that the second field and an identifier of the first hash table fail to match with the second hash table; and the step of storing the second field into the second hash table comprises: storing the second field and an identifier of the first field into the second hash table.

2. A hash table search method, comprising:
   obtaining attribute information of at least two levels of hash tables;
   sequentially obtaining Key information of the at least two levels of hash tables from a received packet according to the attribute information of the at least two levels of hash tables;
   sequentially determining whether the Key information is stored in its corresponding hash table; and
   executing a corresponding action of the hash table corresponding to the Key information, and/or continuing to search a next-level hash table if the Key information is stored in its corresponding hash table;
   wherein the method further comprises:
      obtaining an identifier corresponding to current Key information if it is determined that the Key information is stored in its corresponding hash table; and
      the step of sequentially determining whether the Key information is stored in its corresponding hash table comprises:
         continuing to determine whether Key information of the next-level hash table is stored in its corresponding hash table according to the identifier corresponding to the current Key information and the Key information corresponding to the next-level hash table in the received packet;
      wherein when the at least two levels of hash tables are N levels of hash tables, N>1, and N is a positive integer, and if for an $i^{th}$-level hash table, i=1, Key information stored in a first-level hash table comprises first-level hash table information that corresponds to the first-level hash table that is obtained from the received packet; and
      if for the $i^{th}$-level hash table, N≥i≥2, and i is a positive integer, Key information stored in the $i^{th}$-level hash table comprises: Key information that corresponds to the $i^{th}$-level hash table that is obtained from the received packet, and an identifier that corresponds to Key information of an $(i-1)^{th}$-level hash table that is in the received packet.

3. A hash table storage method, comprising:
   receiving a packet;
   acquiring a first field from the packet, wherein the first field corresponds to attribute information of a first hash table;
   acquiring a second field from the packet, wherein the second field corresponds to attribute information of a second hash table, the attribute information of the first hash table is different from the attribute information of the second hash table and the first field is different from the second field;
   determining whether the first field matches with the first hash table;
   in response to the first field matching with the first hash table, determining whether the second field matches with the second hash table; and
   in response to the second field failing to match with the second hash table, storing the second field into the second hash table.

4. A non-transitory computer readable medium including computer executable instructions that when implemented perform the steps of:
   receiving a packet;
   acquiring a first field from the packet, wherein the first field corresponds to attribute information of a first hash table;
   acquiring a second field from the packet, wherein the second field corresponds to attribute information of a second hash table, the attribute information of the first hash table is different from the attribute information of the second hash table and the first field is different from the second field;
   determining whether the first field matches with the first hash table;
   in response to the first field matching with the first hash table, determining whether the second field matches with the second hash table, when the first field matches with the first hash table;
   in response to the second field failing to match with the second hash table, storing the second field into the second hash table;
   determining that the second field and an identifier of the first hash table fail to match with the second hash table;

and storing the second field and an identifier of the first field into the second hash table.

* * * * *